Aug. 10, 1937.  A. R. WURTELE  2,089,636
INTERNAL COMBUSTION ENGINE
Filed Sept. 10, 1935

INVENTOR.
Allan R. Wurtele
BY J. Barron Smith
ATTORNEY

Patented Aug. 10, 1937

2,089,636

UNITED STATES PATENT OFFICE 2,089,636

INTERNAL COMBUSTION ENGINE

Allan R. Wurtele, New Roads, La.

Application September 10, 1935, Serial No. 39,879

15 Claims. (Cl. 123—32)

This invention relates to internal combustion engines, and more particularly to engines of the solid fuel injection type.

One of the objects of the present invention is to provide novel fuel injecting means for internal combustion engines.

Another object of the invention is to provide a novel combination of an internal combustion engine valve and fuel injection pump.

Still another object is to provide novel means for controlling the speed of a solid fuel injection engine.

A further object is to provide a novel valve for an internal combustion engine which is so constructed that the same may be internally guided and air cooled.

A still further object is to provide a novel valve for an internal combustion engine wherein a precombustion chamber in the head thereof is adapted to be scavenged when the valve is in open position.

The above and further objects and novel features of the invention will more fully appear from the following detail description when taken in connection with the accompanying drawing. It is to be expressly understood, however, that the drawing is for the purpose of illustration only and is not designed as a definition of the limits of the invention, reference being primarily had for this purpose to the appended claims.

In the drawing wherein like reference characters refer to like parts throughout the several views.

Figure 2:
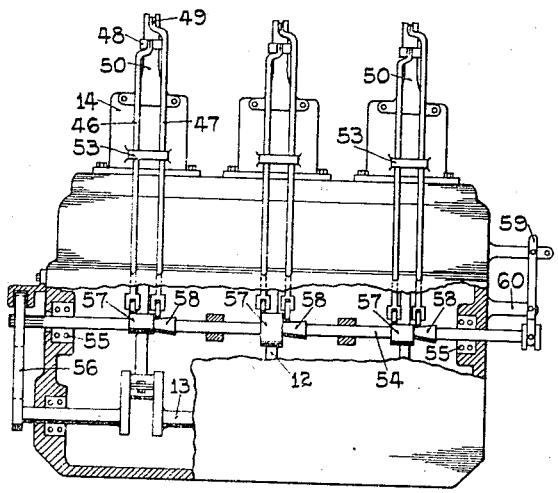
Fig. 2 is a somewhat diagrammatic view, partly in section and with parts broken away, illustrating the control mechanism provided by this invention.

The novel features of the present invention are illustrated in the drawing, by way of example, in combination with a two-cycle, valve-in-head exhaust, port scavenging, solid fuel injection engine comprising a power cylinder 10 and a piston 11 therein operatively connected by means of piston rod 12 (Fig. 2) to the engine crank shaft 13. A cylinder head 14 having a centrally disposed exhaust port, an exhaust gas passage 15, and a valve guide 16 is secured to the upper end of cylinder 10 and is provided with a cooling space 17 in communication through passages 18 with the cylinder cooling chamber 19.

A novel exhaust valve constituted by a hollow, enlarged head portion 20 and a hollow stem 21 adapted to both slide and rotate in valve guide 16 is provided for closing the exhaust port in cylinder head 14. Valve 20, 21 is held upwardly against its seat by means of a spring 22 interposed between the top of cylinder head 14 and an outwardly projecting flange 23 secured in any suitable manner such as by screw threads to the upper end of stem 21. A hollow spindle or barrel 24, stationarily secured to a bracket 25 which is in turn mounted on cylinder head 14, depends into stem 21, the upper end of said spindle having a close sliding fit in the bore of said stem. The lower portion of spindle 24 has a reduced outer diameter and has secured to the lower end thereof a precombustion chamber 26 slidably fitted into a guide 20'' in the hollow head 20 of the valve, thereby forming a cooling space 27 within the valve. Precombustion chamber 26 preferably extends below the face of valve head 20 and is in communication with power cylinder 10 through ports 28 when valve 20, 21 is in closed position.

Figure 5:
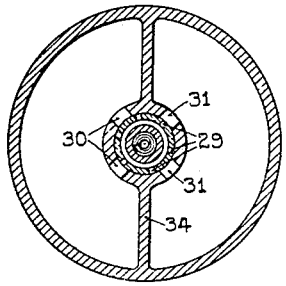
Fig. 5 is a cross-sectional view taken on line 5—5 of Fig. 1.

Novel means are provided for introducing a cooling medium into chamber 27 directly from a source of supply to thereby insure proper cooling of the valve. As shown, space 27 is in communication through a plurality of radial openings 29 circumferentially disposed in stem 21, and through openings 30 and 31 in valve guide 16 with cooling space 17 and a small inlet chamber 32, respectively. The latter chamber is formed in cylinder head 14 by means of partitions 33 and 34 (Figs. 1 and 5) and is adapted to be connected to a source of supply of a cooling medium. The relative number and sizes of ports 29, 30 and 31 are such that space 27 is in communication with chamber 32 and cooling space 17 irrespective of the rotation of valve 20, 21. A cooling medium is thus supplied to valve chamber 27 before being heated by other parts of the engine and is discharged into the main circulating system, thereby insuring good circulation through the valve with maximum cooling effect.

Novel fuel pumping means and control means therefor are provided for injecting fuel into the precombustion chamber or engine power cylinder whereby the speed control of the engine is greatly simplified and the usual time lag occasioned by long fuel lines is eliminated. Such means, as shown, are constituted by a plunger 35 depending into the bore of spindle 24 and yieldingly supported therein by means of a spring 36 which rests upon a perforated plug 37 having a force fit in said spindle.

Fuel is supplied under a small pressure by suitable means (not shown) to the space in spindle 24 below plunger 35 through passages 38 and 39 in bracket 25 and plunger 35, respectively. To prevent the fuel from being injected through ducts 40 into precombustion chamber 26 under the fuel supply pressure a valve 41 is provided in the lower end of spindle 24 which is adapted to be held upwardly against a seat 42 by means of a spring 43 interposed between said seat and a perforated flange 44 secured to the upper end of the stem of valve 41. When, however, plunger 35 is moved downwardly sufficient pressure is built up to open valve 41 and admit a fuel charge to precombustion chamber 26, the fuel being prevented from backing up in the supply line by means of a spring pressed ball check valve 45 supported in a recess in the lower end of plunger 35.

Valve 20, 21 and plunger 35 are adapted to be actuated from a single cam shaft through tappet rods 46 and 47 and tappets 48 and 49 respectively. The latter are shown pivotally supported on a T-shaped bracket 50 mounted on a cylinder head 14 and are provided with rollers 51 and 52 for engaging flange 23 and the upper end of plunger 35, respectively. Guides 53 secured to the side of cylinder head 14 may be provided for guiding tappet rods 46 and 47 in a vertical direction.

A cam shaft 54 is rotatably mounted in the engine crank case, the same being splined in bearings 55 for limited longitudinal movement therein and is drivably connected to the engine crank shaft 13 by any suitable means such as by a chain 56. Cams 57 on the cam shaft are engaged by the lower ends of tappet rods 46 and are arranged to actuate exhaust valves 20, 21 in a desired sequence. In order to control the size of the fuel charge injected into the engine cylinder for each revolution of the crank shaft and hence control the speed of the engine novel means are provided for varying the length of the strokes of plungers 35. Such means as shown are constituted by cams 58, the height of the lobes of which varies uniformly along the longitudinal axis of the cam shaft 54 which, as pointed out above, is mounted for a limited longitudinal movement. Cams 58 engage tappet rods 47 to transmit movement to plungers 35, the extent of such movement depending upon the position of rods 47 on cams 58, which position is in turn controlled by actuation of a control lever 59 pivotally mounted on a bracket 60 and operatively connected to shaft 54 for moving the latter axially. Cams 57 and 58 are preferably double lobed thereby permitting cam shaft 54 to be driven at one-half the speed of crank shaft 13. It will be noted that cams 57 are sufficiently long to accommodate the rollers on the lower ends of tappet rods 46 throughout the longitudinal movement of shaft 54.

Figure 1:
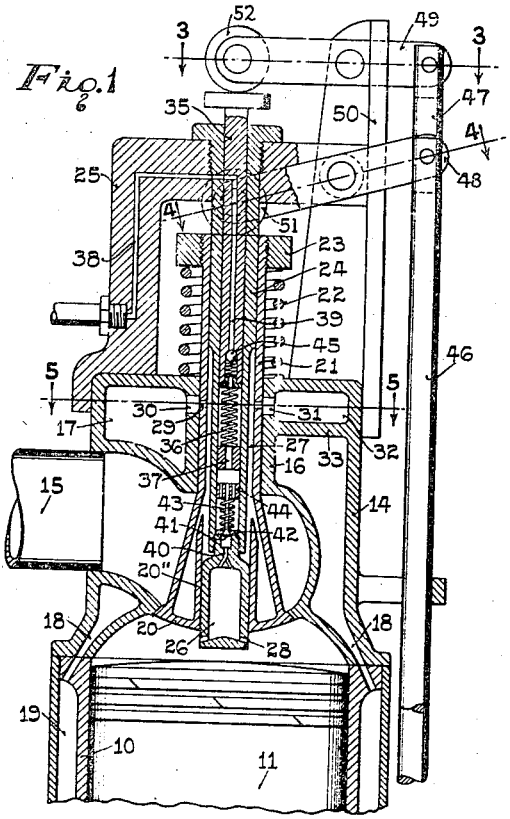
Fig. 1 is a side elevation, partly in section and with parts broken away, of a portion of an engine embodying one form of the present invention.
Figure 3:
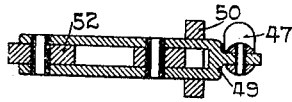
Fig. 3 is a detail view taken on line 3—3 of Fig. 1.
Figure 4:
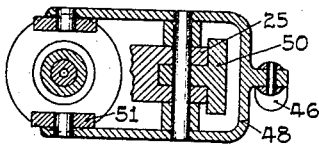
Fig. 4 is a detail view taken on line 4—4 of Fig. 1.

In operation, when piston 11 is near the top of its stroke, as shown in Fig. 1, plunger 35 will be actuated by cam 58 through tappet rod 47 and tappet 49 thereby forcing a charge of fuel under a high pressure through valve 41 and orifices 40 into precombustion chamber 26. The heat of the air charge compressed in cylinder 10 starts the fuel charge to burning in chamber 26, and the burning charge expands through orifices 28 into the power cylinder where burning is completed, the expansion of the gases moving piston 11 downwardly to rotatably drive crank shaft 13.

As piston 11 nears the bottom of its stroke, exhaust valve 20, 21 is opened by the action of cams 57 through tappet rod 46 and tappet 48 at substantially the same time that said piston 11 uncovers suitable scavenging ports in the walls of cylinder 10 adjacent the lower end thereof. The scavenging or inlet ports and associated parts may be of the usual or any suitable or desirable construction, many such constructions being well-known in the art. Scavenging air entering said ports is effective to thoroughly scavenge the engine cylinder and, when the exhaust valve is again closed, to supercharge the cylinder with a supply of fresh air. As piston 11 moves upwardly after again closing the scavenging ports the air in the cylinder is compressed and the cycle repeated. It will thus be seen that the engine of the illustrated embodiment operates on a two-stroke cycle, that is, every down stroke of piston 11 is a power stroke and every up stroke thereof is a compression stroke. The fuel chamber in spindle 24 between the valves 41 and 45 is replenished after each stroke of plunger 35 by suitable pump means (not shown) through passages 38 and 39. It will be noted that ports 28 are bored in the side walls of chamber 26 at the lower end thereof, the same being adapted to be covered by guide 20″ when valve 20, 21 is in opened position. Fuel may, therefore, be pumped into said chamber when said valve is open and while a comparatively low pressure exists therein thus eliminating the necessity for the usual high pressures employed for injecting the fuel into this type of engine, while at the same time avoiding waste by preventing any of the charge from being carried out with the exhaust gases.

To regulate the speed of the engine, lever 59 may be actuated thus moving shaft 54 longitudinally to bring higher or lower portions, as the case may be, of cams 58 into engagement with the rollers on tappet rods 47, thereby increasing or decreasing, respectively, the stroke of plungers 35 and altering the size of the fuel charge proportionally.

Figure 6:
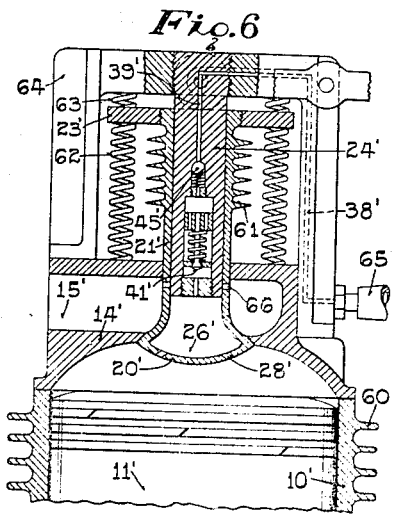
Fig. 6 is a side elevation, partly in section and with parts broken away, of another embodiment of the invention.

A second embodiment of the novel valve comprehended by the present invention is, as shown in Fig. 6, adapted for use with an air-cooled internal combustion engine comprising a power cylinder 10′ having a plurality of heat conducting fins 60 on the surface thereof and a piston 11′ adapted for reciprocation therein. A cylinder head 14′ of very simple construction having only a centrally disposed exhaust port and an exhaust gas passage 15′ therein, is secured to the top of cylinder 10′, the cooling space and valve guide usually employed in cylinder heads being rendered unnecessary by the novel valve construction to be hereinafter described.

The valve as illustrated (Fig. 6) comprises an enlarged hollow head portion 20′ adapted to seat upwardly against a seat surrounding the port in cylinder head 14′ and a hollow stem 21′ which projects upwardly through an opening in the top of said cylinder head. As will be understood by those skilled in the art, stem 21′ may be formed of two or more parts to facilitate assembly. Formed on the outer surface of stem 21′ or otherwise suitably secured thereto are a plurality of heat conducting fins 61 providing cooling means for the valve. Valve 20', 21' is preferably held on its seat by a plurality of springs 62 interposed between a flange 23' on the upper end of stem 21', and the upper surface of cylinder head 14'. To prevent any possibility of the valve slamming during closure thereof suitable buffer springs 63 may be interposed between the top of flange 23' and a U-shaped bracket 64 secured to cylinder head 14' and bridging stem 21'.

Rigidly secured to bracket 64 and depending into stem 21' to a point slightly below the upper inner wall of exhaust gas passage 15' is a guide or spindle 24' having an outer diameter substantially equal to the inner diameter of the stem. Spindle 24' thus serves as internal guiding means for valve 20', 21' thereby permitting the overall length of the valve to be minimized and a larger number of cooling fins placed thereon. The lower end of spindle 24' is recessed and has mounted therein a pair of valves 41' and 45' similarly constructed and serving to prevent explosion pressures from reaching the fuel passage above valve 45' and to prevent dripping. Fuel may be supplied to the precombustion chamber, by means of a pump 65 mounted on the cylinder head, through passages 38' and 39' in bracket 64 and spindle 24', respectively, said pump being adapted to be actuated by tappet rods similar to rods 47 of Fig. 1.

The hollow head portion 20' of the valve is preferably employed as a precombustion chamber 26' which is connected with power cylinder 10' by means of a plurality of orifices 28' in the face of valve head 20'. To further cool the valve and for the purpose of scavenging chamber 26' thereby increasing the operating efficiency of the engine, a plurality of radial openings 66 are circumferentially disposed in the walls of stem 21'. Openings 66 are so positioned on stem 21' that the same will be opened and closed by the lower end of spindle 24' when exhaust valve 20', 21' is actuated. It will thus be noted that when the exhaust valve is opened scavenging air entering the cylinder, as pointed out above in the description of the operation of the first embodiment, will pass through orifices 28' scavenging the precombustion chamber 26' and passing out through openings 66 to the exhaust gas passage 15'. The precombustion chamber is thus cooled and supplied with a fresh supply of air after each explosion in the power cylinder, thereby materially increasing the efficiency of operation.

There is thus provided novel means for injecting a fuel through a power cylinder valve into the power cylinder of a solid fuel injection engine, said valve being so constructed that maximum cooling of the same is obtained. There is also provided a valve which is adapted to be air cooled and has internal guiding means, thereby rendering possible the simplification of the cylinder head and shortening of said head and the valve stem, adapting the same for use on air-cooled, high speed radial engines without unduly increasing the air resistance of the same. Novel speed control means which is simple and efficient is also provided in combination with the novel valve and fuel pumping means.

Although only two embodiments of the invention have been illustrated and described it is to be expressly understood that the same is not limited thereto but that various mechanical changes may be made therein such as, for example, either of the two embodiments may, if desired, be designed without a precombustion chamber, the fuel being injected directly into the power cylinder. Various changes may also be made in the design and arrangement of parts illlustrated as will now be apparent to those skilled in the art without departing from the spirit of the invention. Reference will, therefore, be primarily had to the appended claims for a definition of the limits of the invention.

What is claimed is:

1. In an engine of the class described, a cylinder, a cylinder head therefor, a bracket carried by the cylinder head, a stationary guiding member carried by the bracket and having a fuel passage therethrough, a valve for closing an exhaust port in said cylinder head, said valve surrounding and being adapted for sliding engagement with said guiding member, and a plurality of upwardly seating valves within the guiding member for preventing explosion pressures from being transmitted to said fuel passage.

2. In an engine of the class described, a cylinder, a cylinder head therefor, the latter being provided with an exhaust gas opening, a valve for said opening, a bracket carried by the cylinder head, a stationary guiding member carried by the bracket and extending into the valve to guide the latter in its opening and closing movements, said guiding member having sliding engagement with the valve adjacent the opposite ends thereof, valve means adapted to close a fuel passage in the guiding member, and means for actuating said valve.

3. In an internal combustion engine, a cylinder, a cylinder head therefor, said head having an exhaust gas passage, a valve, having a precombustion chamber, for closing said passage, a stationary guiding member supported by the cylinder head and extending interiorly of said valve, said member having a fuel passage therein, a pair of spring pressed valve members within the interiorly extending portion of said stationary guiding member for closing said fuel passage, and means for actuating said valve.

4. In an internal combustion engine, a cylinder, a cylinder head therefor, said head having an exhaust gas passage therein, a valve for closing said passage, a bracket carried by the cylinder head, a stationary guiding member carried by the bracket and extending into the valve, said guiding member having sliding engagement with said valve adjacent the upper and lower ends thereof and being provided with a fuel passage, a fuel plunger extending into said stationary guide, and means for actuating said plunger.

5. In an internal combustion engine, a cylinder, a cylinder head therefor, said head having an exhaust gas passage therein, a valve for closing said passage, a guiding member for the valve supported by said head, a precombustion chamber in said guiding member, and fuel pumping means including a plunger adapted for reciprocation in said guiding member.

6. In an internal combustion engine, a cylinder, a cylinder head therefor, a valve for closing an exhaust passage in said cylinder head, said valve having a precombustion chamber, a bracket carried by the cylinder head, a stationary guiding member carried by the bracket and extending into said valve, said guiding member having a fuel passage therein, a spring pressed valve carried by said guiding member for closing said passage, and means for actuating said first named valve.

7. In an internal combustion engine, a power cylinder, a head for said cylinder having a port therein, a valve having an enlarged head portion and a hollow stem, a stationary spindle depending into said stem and serving as an interior guide for said valve, the lower end of said spindle constituting a precombustion chamber, and means for introducing a fuel through a passage in said spindle into said precombustion chamber.

8. In an internal combustion engine, a power cylinder, a cylinder head therefor having a port and an exhaust gas passage therein, a valve for said port having a hollow head portion constituting a precombustion chamber, guide means internally of said valve, means for introducing a fuel into said precombustion chamber, and means for scavenging the latter through openings communicating with said exhaust gas passage when said valve is in open position.

9. In an internal combustion engine, a power cylinder, a cylinder head therefor having a port and an exhaust gas passage therein, and a valve for said port having a precombustion chamber therein, said precombustion chamber being in communication with said power cylinder when the valve is in closed position and in communication with both the power cylinder and said exhaust gas passage when the valve is in open position.

10. In an internal combustion engine, a cylinder, a cylinder head therefor, said head having an opening therein, a valve for closing said opening, a guide member for the valve supported by said head, a precombustion chamber in said guide member, and means for supplying fuel to said precombustion chamber.

11. In an internal combustion engine, a power cylinder having a port, a valve for said port, a precombustion chamber having port means communicating with the interior of said cylinder, means for supplying fuel to said precombustion chamber, and means for simultaneously actuating said valve and closing said port means between the precombustion chamber and the engine cylinder.

12. In an internal combustion engine, a cylinder, a cylinder head therefor, said head having an opening therein, a valve for said opening, a precombustion chamber having communication with said cylinder, said valve being adapted to cut off said communication when the same is in open position, and means for supplying fuel to said precombustion chamber.

13. In an internal combustion engine, a cylinder, a cylinder head therefor, said head having an opening therein, a valve and stem for said opening, a stationary member extending through said valve and stem and having a precombustion chamber adjacent the lower end thereof having communication with said cylinder, said valve being adapted to cut off said communication when the same is in open position, and means for supplying fuel to said precombustion chamber.

14. In an internal combustion engine, a cylinder having a head with an opening therein, a valve for closing said opening, a stationary guiding member supported by said head and extending into the valve, said guiding member having sliding engagement with said valve adjacent the upper and lower ends thereof and being provided with a fuel passage, a plunger extending into said stationary guide, and means for actuating said plunger.

15. In an internal combustion engine, a cylinder having a head with an opening therein, a valve for said opening, said valve having a precombustion chamber therein, a stationary guide member supported by said head and extending into said valve, said stationary member having a fuel passage therein, a spring pressed valve carried by said guide member for closing said passage, and means for actuating said first-named valve.

ALLAN R. WURTELE.